(12) United States Patent
Castet et al.

(10) Patent No.: US 11,424,927 B2
(45) Date of Patent: Aug. 23, 2022

(54) CONTINUITY OF ACCESS TO AVIONIC DATA OUTSIDE OF THE COCKPIT OF AN AIRCRAFT

(71) Applicant: THALES, Courbevoie (FR)

(72) Inventors: Laurent Castet, Toulouse (FR); Renaud Erba, Toulouse (FR); Frédéric Sanchez, Toulouse (FR)

(73) Assignee: THALES, Courbevoie (FR)

( * ) Notice: Subject to any disclaimer, the term of this patent is extended or adjusted under 35 U.S.C. 154(b) by 643 days.

(21) Appl. No.: 16/516,116

(22) Filed: Jul. 18, 2019

(65) Prior Publication Data

US 2020/0028687 A1 Jan. 23, 2020

(30) Foreign Application Priority Data

Jul. 20, 2018 (FR) ...................................... 1800789

(51) Int. Cl.
| | |
|---|---|
| *H04W 4/80* | (2018.01) |
| *H04L 9/32* | (2006.01) |
| *G06F 16/909* | (2019.01) |
| *H04B 7/185* | (2006.01) |
| *H04W 12/64* | (2021.01) |

(52) U.S. Cl.
CPC .......... *H04L 9/3231* (2013.01); *G06F 16/909* (2019.01); *H04B 7/18506* (2013.01); *H04W 4/80* (2018.02); *H04W 12/64* (2021.01)

(58) Field of Classification Search
CPC ..... H04L 9/3231; H04L 63/107; H04L 67/12; G06F 16/909; H04B 7/18506; H04W 4/80; H04W 12/64; H04W 4/023; H04W 4/42; H04W 4/48; H04W 12/086; B64D 11/0015; G06Q 50/30; G07C 5/0816; G07C 5/0841; G08G 5/003; G16H 40/63
USPC ........................................................ 380/270
See application file for complete search history.

(56) References Cited

U.S. PATENT DOCUMENTS

| | | | |
|---|---|---|---|
| 8,331,926 B2 * | 12/2012 | Mitchell | ............ H04B 7/18506 455/431 |
| 8,495,722 B1 | 7/2013 | Mccusker | |
| 9,043,938 B1 | 5/2015 | Raghu et al. | |
| 9,284,045 B1 | 3/2016 | Springer et al. | |

(Continued)

FOREIGN PATENT DOCUMENTS

EP 3 002 966 A1 4/2016

*Primary Examiner* — Amancio Gonzalez
(74) *Attorney, Agent, or Firm* — BakerHostetler

(57) ABSTRACT

Systems and methods for communicating avionic data to a non-avionic device situated outside of the cockpit of an aircraft are provided. A method may comprise the steps of receiving a request, aimed at receiving avionic data from avionic systems, from a non-avionic client device; determining the distance between the non-avionic device and the cockpit of the aircraft; and adjusting the sending of data in response to the request depending on the determined distance. Developments of the invention describe the use of a wireless access point associated with a secure gateway determining the access rights to the avionic data for the non-avionic device, various sending and/or display adjustments depending notably on the distance, threshold management, various indoor positioning techniques, unilateral or bilateral communications, various notifications, the use of lightweight connected clients (for example earpiece, watch, glasses, etc.).

17 Claims, 4 Drawing Sheets

(56) References Cited

U.S. PATENT DOCUMENTS

| | | | |
|---|---|---|---|
| 10,511,515 B1* | 12/2019 | Ehlinger | H04L 69/08 |
| 10,532,823 B1* | 1/2020 | Barber | G08G 5/0065 |
| 2005/0026609 A1* | 2/2005 | Brinkley | H04L 67/04 |
| | | | 455/426.2 |
| 2007/0027589 A1* | 2/2007 | Brinkley | G08G 5/0013 |
| | | | 701/3 |
| 2010/0075614 A1* | 3/2010 | Judd | H04B 7/18506 |
| | | | 455/73 |
| 2020/0396602 A1* | 12/2020 | Avila | G06F 1/28 |

* cited by examiner

CONTINUITY OF ACCESS TO AVIONIC DATA OUTSIDE OF THE COCKPIT OF AN AIRCRAFT

CROSS-REFERENCE TO RELATED APPLICATIONS

This application claims priority to foreign French patent application No. FR 1800789, filed on Jul. 20, 2018, the disclosure of which is incorporated by reference in its entirety.

FIELD OF THE INVENTION

The invention relates to the field of aeronautics in general, and more particularly to methods and systems for continuously accessing avionic data outside of the cockpit, to avionic data management and to the distribution of displays, and to the management of flight parameters transmitted by a non-avionic device.

BACKGROUND

Access to avionic data (data subject to a high integrity and security level and that are manipulated by numerous functions or systems for ensuring performance of the flight) is generally only possible from the cockpit where all of the interfaces for interacting with these functions and systems are gathered.

If the pilot leaves the cockpit for any reason (for example rest period during a long-haul flight for example, to go to the toilet, etc.), he no longer has access to these data, thus creating a break in the performance of his mission. There are therefore spatial delimitations upon which access to the desired data is conditional.

On board an aircraft, there are several locations at which data consultation and/or editing interfaces exist. These locations may be spatially distributed and may generate numerous movements (tiredness, loss of time, risk of error, disruption to the passengers, etc.) or prove inconvenient in the layout of the cabin, or even overly accessible to the passengers.

Pilots or copilots are specifically not the only people needing to access avionic data. The flight crew also sometimes have to interact with the avionic functions and subsystems, which may lead to a great number of movements in the plane. These interactions may lead to tiredness, stress, and may furthermore disrupt the passengers in the cabin. In other words, mobility in the aircraft may go against the effectiveness of decision-making, due to the limitation of actions performed in space.

These technical problems do not currently have any technical solutions. Some patent documents describe the use of passenger screens (acronym IFE for "in-flight entertainment"). These approaches have limitations (for example availability of the screens, confidentiality and security, etc.).

Patent document U.S. Pat. No. 9,284,045 describes techniques for simplifying the operation and the maintenance of an aircraft by configuring an avionic unit so as to communicate wirelessly and transparently receive data linked to the avionics. In some embodiments, an aircraft is equipped with a legal certified avionic device configured so as to be installed in the aircraft. The system comprises a memory card reader and an associated memory card. The memory card comprises a wireless transceiver for facilitating communication between the avionic unit and a mobile device (for example a computer, a tablet or a smartphone using a suitable application, a portable avionic device, etc.). This approach has limitations.

There is a need for advanced methods and systems for continuously accessing avionic data in real time outside of the cockpit, notably in terms of consulting and modifying avionic data.

SUMMARY OF THE INVENTION

The invention relates to systems and methods for communicating avionic data to a non-avionic device situated outside of the cockpit of an aircraft. A method may comprise the steps of receiving a request, aimed at receiving avionic data from avionic systems, from a non-avionic client device, determining the distance between the non-avionic device and the cockpit of the aircraft; and adjusting the sending of data in response to said request depending on the determined distance. Developments of the invention describe the use of a wireless access point associated with a secure gateway determining the access rights to the avionic data for the non-avionic device, various sending and/or display adjustments depending notably on the distance, threshold management, various indoor positioning techniques, unilateral or bilateral communications, various notifications, the use of lightweight connected clients (for example earpiece, watch, glasses, etc.).

Advantageously, the embodiments of the invention will be used in commercial or military airliners by the various crew in charge, notably pilots, flight attendants and maintenance staff.

Advantageously, in particular during long-duration flights, the embodiments of the invention allow continuous connectivity for the users with the avionic systems.

Advantageously, the embodiments according to the invention allow great mobility and freedom of movement, due to the use of lightweight, ergonomic and unobtrusive secure clients.

Advantageously, the embodiments of the invention improve the security and the safety of the flight, by allowing the pilot to remain in contact with the operational mission at all times, and therefore even outside of the cockpit.

Advantageously, the embodiments of the invention may contribute to reducing the workload and therefore the risks of human errors.

Advantageously, the embodiments of the invention may improve the security of the flight by adding mission continuity (in time and in space), while at the same time limiting activities having low added value and while reducing the risks of human errors.

Advantageously, the embodiments of the invention make it possible to synchronize the various crew distributed throughout the plane to one and the same reliable and coherent item of information. Moreover, new possibilities for interaction between the flight crew become possible.

Advantageously, the embodiments according to the invention allow optimized presentation of the various data depending on the device that is worn. Specifically, the user interfaces may be adapted to the dimensions and to the resolutions of accessible screens considered in their entirety (for example interaction between screens, that is to say spatial distribution of the display).

Advantageously, the embodiments of the invention allow the use of data from the open world (for example data cross-correlation, correlation, inference, application of logic rules, etc.), in addition to the avionic data. The combined data may thus be enriched and improve aeronautical safety and/or security (high-level consolidated information with high added value).

Advantageously, one embodiment of the invention makes it possible to access fused and synthetic information, based on data that are normally able to be consulted only through specific media, which are not collocated and without the possibility of simply superimposing them so as to draw a consolidated and relevant item of information therefrom.

In particular, the invention makes it possible to fuse data from the avionic world (computers and functions on board the plane) with data from the open world (possibly originating from the ground or from other planes). The accessible data thus cover both the avionic world and the open world.

In addition, the presentation of the data may be improved so as to provide the most ergonomic, the most synthetic and the most relevant item of information possible. The invention allows remote interaction between the users and the functions of the avionic world, and between the users themselves.

Advantageously, the embodiments make it possible to reduce the stress of the flight crew by virtue of the notification functions on the lightweight clients, thus avoiding needless movements in the plane (required up until now to go and check on the source of the information, for example between the cockpit and the cabin). The embodiments of the invention may allow new interactions between flight crew members.

Advantageously, some embodiments of the invention make it possible to reduce activities having low added value, by providing enriched information (data processing is automated, that is to say performed partly by the avionic systems, which notably take over processing and assimilating the information in the raw state or the low-level information).

Advantageously, the embodiments of the invention make it possible to reduce the risks of human errors.

The embodiments of the invention generally make it possible to achieve usage gains (users focus on performing activities having a high added value).

BRIEF DESCRIPTION OF THE DRAWINGS

Other features and advantages of the invention will become apparent with the aid of the following description and the figures of the appended drawings, in which.

DETAILED DESCRIPTION

Figure 1:
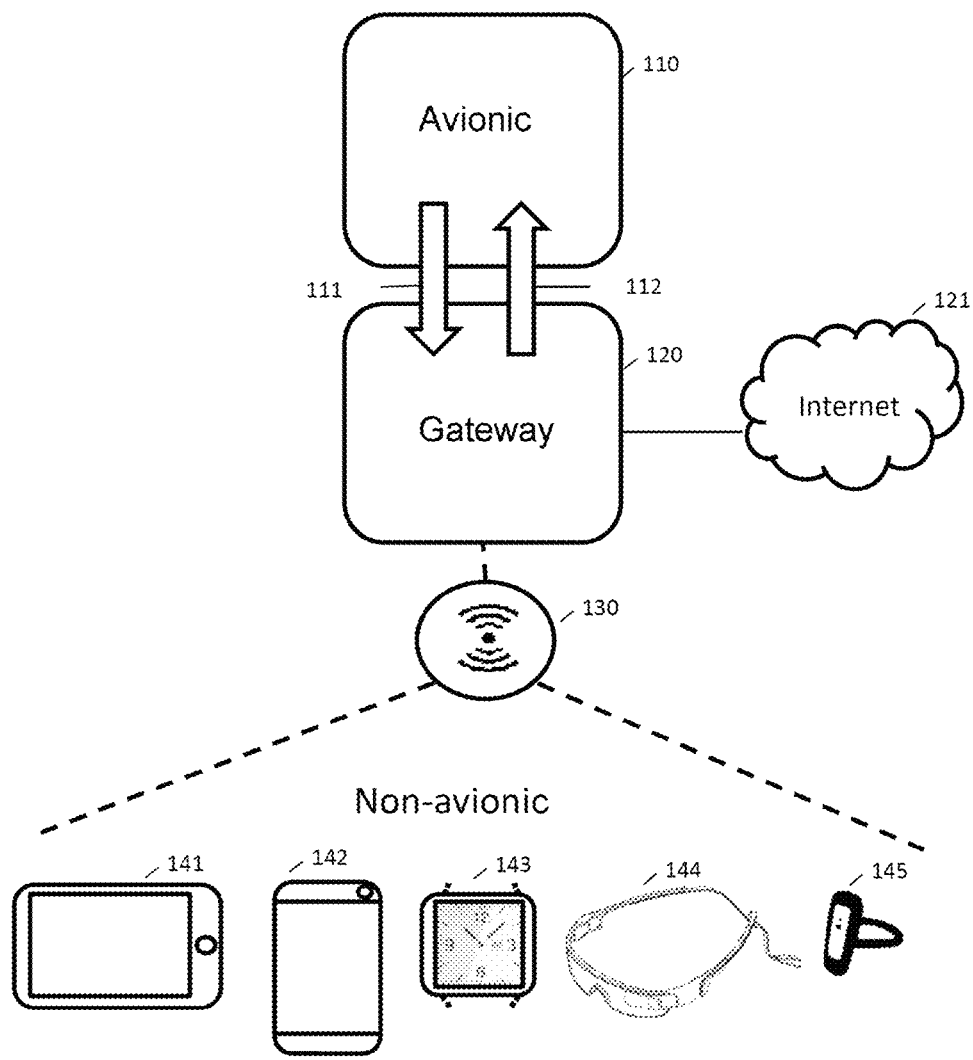
FIG. 1 illustrates certain aspects of the general architecture of the embodiments of the invention.

Certain technical terms and environments are defined below.

An aircraft is a transport means capable of moving in the Earth's atmosphere. For example, an aircraft may be a plane or a helicopter (or even a drone).

An "avionic system" (or "system of avionic type") is a system having specific technical features in comparison with a "non-avionic" system (or "system of non-avionic type" or "open world type"), these technical features being certified administratively by a security monitoring authority (in this case the aeronautical regulator).

The aircraft comprises a piloting cabin and avionics bays. Within these are situated avionic piloting and navigation devices installed by the aircraft manufacturer (certified by the aeronautical regulator within a certificate of what is called "TC" type), avionic devices installed by the flight engineer (certified by the aeronautical regulator within an additional certificate of what is called "STC" type), and optional non-avionic devices (the use of which is approved by the aeronautical regulator within an operational approval called "Ops Approval").

With regard to the distinctive technical features of an avionic system, a system—generally, that is to say avionic or non-avionic—may have or be associated with a predefined failure rate (from a predefined failure rate range), a failure rate comprising or determining a predefined execution error rate.

In one embodiment, the failure rate of an avionic system is lower than the failure rate of a non-avionic system. In one embodiment, the failure rate of an avionic system is significantly or substantially lower than that of a non-avionic system.

An avionic system denotes a reliable system (or a system with guaranteed reliability). It is a system the failure of which has consequences that exceed accepted or acceptable and therefore critical limits. A failure may be characterized by the loss of the function under consideration, or by the production of erroneous data, with or without detection of an error. Depending on the level of criticality of the critical consequences, the probability of occurrence must be kept below a threshold of acceptability. Thus, the more critical the consequence, the lower the acceptable probability of occurrence. For example, in aeronautics, a catastrophic event (multiple deaths) will have to have a probability of occurrence of less than $10^{-9}$ per flight hour, while a major incident (reduction of the safety margins and of the operational capabilities, discomfort or minor injuries) will have to have a probability of occurrence of less than $10^{-5}$ per flight hour. To meet these objectives, the architecture of the (reliable) avionic system and also the design of each component guarantee this probability of occurrence through guarantees of fault rate for each device (physical faults) and verification levels (functional and structural test coverage) of the software.

These demands impose a significant design and verification effort, and impose a limitation on the complexity of the processing operations that are implemented.

On the other hand, the failure of an unreliable system, or a system with non-guaranteed reliability (non-avionic system), has consequences that are deemed to be tolerable, non-critical, or even not to have a significant operational impact. The demands on the architecture, the physical components or the software processing operations are therefore lower, and permit more complex processing operations and development and verification efforts that are lower in comparison with a reliable system.

Generally, an avionic system is associated with a physical fault rate that is lower and a logic verification that is higher than that of a non-avionic system.

Various embodiments are described below.

With regard notably to the general architecture for managing and accessing data outside of the cockpit, what is described is a method for communicating avionic data to a non-avionic device situated outside of the cockpit of an aircraft, the method comprising the steps of: receiving a request, aimed at receiving avionic data from one or more avionic systems situated at a reference point in the aircraft, from a non-avionic client device; determining a connection parameter between the non-avionic client device and the reference point; adjusting the sending of data in response to said request depending on the determined connection parameter.

In one embodiment, what is described is a method for communicating avionic data to a non-avionic device situated outside of the cockpit of an aircraft, the method comprising the steps of: receiving a request, aimed at receiving avionic data from one or more avionic systems, from a non-avionic client device; determining a connection parameter, such as the distance between the non-avionic device and the cockpit of an aircraft (for example of the aircraft, or of the cockpit of an escort plane), adjusting the sending of data in response to said request depending on the determined distance.

In one embodiment, the connection parameter comprises one or more space and/or time parameters characterizing the relationship between the non-avionic client device and one or more avionic systems, the connection parameter notably comprising the physical distance between the non-avionic client device and the reference point in the aircraft, and/or the quality of service associated with the wireless communications between the non-avionic client device and the reference point in the aircraft, and/or a predefined access right associated with an avionic device and/or with the non-avionic client device.

According to the embodiments, the connection parameter may vary. The connection parameter defines the relationship between the non-avionic device and another spatial reference point in the aircraft. The parameter may be spacebased and/or time-based. The non-avionic device may be associated with or relate to the user. The connection parameter may therefore also comprise for example the rank of the user and/or the seniority of the user who is using the device (access rights management). The connection parameter may comprise the location of the device in relation to a reference point, which may be the cockpit, but also other parts of the aircraft, such as an emergency door, a rest point, a passenger seat or flight attendant seat, etc. The connection parameter may comprise quality of service (QoS) indicators, such as the stability and/or the bit rate of the communications on board the aircraft (for example connection quality, time delay or lag, etc.). In one embodiment, the connection parameter comprises one or more temporal criteria (for example certain responses have to be made within predefined time intervals, neither too early nor too late), this being able to indirectly indicate a response emanating from a human and/or form a secret associated with the communication mode. In one embodiment, the connection parameter is a synthetic parameter, that is to say which combines or aggregates a plurality of the parameters listed above.

In one embodiment, the aircraft may be a remotely piloted drone and conditions pertaining to the connection parameter may be critical (for example the distance determined between the control station and the drone at a given time may form the condition for sending and/or receiving data). The communications, where applicable, are performed using HF, VHF or SatCom.

In one embodiment, the reference point is the cockpit of the aircraft. In one embodiment, the reference point is the cockpit of another aircraft (for example escort). In other embodiments, the reference point may be an emergency door, or a rest point, or a passenger seat, etc.

In one embodiment, the request is received by a wireless access point associated with a secure gateway, said secure gateway determining the access rights to the avionic data for the non-avionic device. In one embodiment, the secure gateway for exchanging data between avionic systems and non-avionic systems implements functionalities comprising routing rules, communication port management for authorizing or prohibiting communications, and protocol layer management. In one embodiment, the step of adjusting the sending of data is furthermore dependent on the display and/or computational capabilities of the non-avionic client device. In one embodiment, the sending of data is reduced or stopped or increased or modified if the determined distance is above or below predefined thresholds or threshold ranges. In one embodiment, the step of determining the distance or the position between the non-avionic device and the cockpit of the aircraft is performed by applying one or more technologies comprising FM radio fingerprint positioning, by using a network of Bluetooth BLE beacons, by using a network of RFID beacons, by using a ground covering with networks of on-board sensors, by combining RFID and WLAN technologies, through image recognition, by ultrasound and angle of arrival techniques, by using an inertial measurement unit and/or positioning using ambient magnetic field measurement. In one embodiment, the communications are unidirectional from avionic systems to the non-avionic device, said communications comprising one or more notifications using one or more techniques, comprising a visual, audio and/or vibration-based technique. In one embodiment, the communications are bidirectional between the avionic systems and the non-avionic device. In one embodiment, the non-avionic device comprises an earpiece and/or a connected watch and/or a pair of connected glasses. In one embodiment, the method furthermore comprises a step of sending data from the non-avionic client device to the avionic systems of the cockpit, the sending being wireless from predefined non-public spatial areas in the aircraft, and/or by way of wired connections not accessible to the passengers. In one embodiment, the method furthermore comprises one or more of the steps of making the sending of data conditional on the previous registration of the non-avionic device with the cockpit, carrying out a secure and/or biometric authentication step, checking the physiological conditions of the wearer of the non-avionic device, and/or encrypting the communications.

With regard notably to the management (fusion, assimilation, learning, etc.) of the data and the display techniques and/or the aspects described above, what is described is a method for communicating avionic data to a non-avionic lightweight client device, the method comprising the steps of:—receiving and displaying avionic data from a plurality of avionic systems;—modifying the received avionic data, by adding or deleting or fusing data;—displaying the modified data on one or more non-avionic lightweight clients. In one embodiment, the data of the avionic systems are accessible to the non-avionic lightweight clients by way of a wireless access point associated with a secure gateway comprising routing, access right management and protocol layer functions. In one embodiment, the communications between the avionic systems and the non-avionic lightweight clients are multiplexed. In one embodiment, the method furthermore comprises the step of exclusively associating one or more avionic systems with one or more non-avionic devices. In one embodiment, the method furthermore comprises the steps of determining the computational and/or display resources of a non-avionic lightweight client, called target resources; and adjusting the display of the modified data on said non-avionic lightweight client depending on said target resources. In one embodiment, the display step involves distributing the display on one or more pre-existing screens, notably IFE screens, situated close to the non-avionic device. In one embodiment, the method furthermore comprises the step of projecting, close to a wearer of a non-avionic lightweight client, an image showing the modified avionic data on one or more supports that do not constitute a priori display screens by deforming the projected image so as to conform to the profiles and/or discontinuities of the surfaces onto which the image is projected. In one embodiment, the method furthermore comprises a step of determining a subjective view of the wearer of the non-avionic device using a camera worn by said wearer. In one embodiment, a plurality of non-avionic lightweight clients communicate with one another via the secure gateway. In one embodiment, a non-avionic lightweight client is a connected earpiece and/or a connected watch and/or a pair of connected glasses.

With regard notably to the flight parameters manipulated from a lightweight client, and/or the aspects described above, what is described is a method for communicating avionic data to a non-avionic device, the method comprising the steps of: receiving a flight parameter from a non-avionic lightweight client; determining or receiving physiological data and/or biometric data associated with the wearer of the non-avionic lightweight client; making the insertion of the flight parameter into an avionic system conditional on the meeting of predefined conditions pertaining to the physiological and/or biometric data. In one embodiment, the method furthermore comprises a step of determining the distance between the non-avionic device and the cockpit of the aircraft; and the predefined conditions furthermore pertain to said determined distance. In one embodiment, the method furthermore comprises a step of checking the integrity of the transmitted command message/flight parameter and/or an encryption step. In one embodiment, the physiological conditions relate to one or more parameters comprising gaze tracking, eye movement tracking, gaze fixations, cortisol level, heart rate, variability of this heart rate, one or more markers of the activity of the parasympathetic nervous system, breathing rate, skin temperature, perspiration level, skin conductivity, pupil dilation, an electrocardiography signal, an electroencephalography signal, and a magnetoencephalography signal. In one embodiment, the method furthermore comprises a step of associating the received flight command with a plurality of elementary requests communicated to a plurality of avionic devices, said requests notably being associated with one or more application programming interfaces APIs. In one embodiment, the flight command (or item of data or flight parameter) is communicated through audio and processed using voice recognition. In one embodiment, the method furthermore comprises a step of broadcasting a message from an avionic system to the non-avionic lightweight client. In one embodiment, the message is rendered using one or more form techniques chosen from among a vibration, a sound, an image or a video. In one embodiment, the message is a configurable or deactivatable or acknowledgeable notification. In one embodiment, a non-avionic lightweight client is a connected earpiece and/or a connected watch and/or a wearable computer and/or a bracelet.

In one embodiment, an avionic system is associated with a physical fault rate that is lower and a logic verification that is higher than that of a non-avionic system.

In one embodiment, an avionic system is associated with a test and/or verification exhaustiveness that is higher than that of a non-avionic system.

FIG. 1 illustrates certain aspects of the general architecture of the embodiments of the invention.

The avionic data 110 of the cockpit are communicated to a secure gateway 120, which serves (directly or indirectly via non-avionic subsystems) one or more lightweight clients of tablet (or laptop computer) 141, mobile telephone 142, connected watch 143, connected glasses 144 or connected earpiece 145 type (for example Bluetooth or Wi-Fi, external, implanted, etc.) or using other display and/or information rendering systems (not shown), which notably comprise a headset-microphone combination (a microphone may notably operate through bone conduction), a pico-projector, etc. Even more generally, a lightweight client may be a wearable computer, in any form (bracelet, pico-projector, retinal implant, e-textile, etc.).

In one embodiment, a lightweight client executes a mobile application. In the remainder of this document, "local application" will be the name given to the software application that runs on the connected apparatus.

The local application on the apparatus is connected to the avionic world (for example using Wi-Fi) via a secure gateway, which is itself connected to the various functions or on-board computers (via the avionic network, for example using AFDX), and to other data sources from the open world 121. Conceptually speaking, there is no limit on the number of connected users. In addition, the users are able to cover various profiles (pilots, flight attendants). The local applications adapt both to the type of connected apparatus (available display capabilities and resources) and to the profile of the user (selection of relevant data depending on the type of mission of the user).

Operationally speaking, however, the number of users may be limited due to the capacities of the network and the security constraints to be managed.

In one optional embodiment, a local application may be based on a third-party application that runs in addition to the local applications. This third-party application may for example act as a proxy for the local functions that interact with the avionic functions through the third-party application.

This third-party application may be hosted by the secure gateway itself or by a third-party machine that is not necessarily mobile, situated in the open world and that connects to the gateway via the wireless access point (for example Wi-Fi). In the remainder of this document, reference will be made to the "central application" to denote this third-party application.

In one embodiment, the method according to the invention allows interactions between lightweight clients and avionic functions (for example placing commands integrated at a high level of abstraction).

Secure Gateway

This gateway allows communication between the "open world" and the avionic world. Generally speaking, this gateway may be responsible for the following functions:
routing function (the gateway has a configuration function that makes it possible to authorize or to prohibit connections (111 and/or 112) between the devices from the avionic world and those from the open world via routing rules);
security filtering function: the gateway has a configuration function that makes it possible to authorize or to prohibit communication between devices, for example via specific ports (firewall functions), notably in the direction from the open world to the avionic world 112, which requires a high data integrity level;

protocol layer management function: the gateway has functions for converting avionics-specific protocols into open-world protocols (for example TCP/IP or UDP/IP) and vice versa.

More generally, the avionic and non-avionic systems interact by mediation through a regulatory body, for example the secure gateway. The principles of regulating the exchanges between the avionic systems and non-avionic systems may be varied. The various techniques may take into account (that is to say directly or indirectly modulate) one or more of the following parameters: a) the directionality of the exchanges (unidirectional and/or bidirectional, static and invariant over time, or dynamic, for example depending on the flight context or predefined rules); b) the form of the exchanged data (for example data format, protocol type, translation/bridging, etc.). Compression or transcoding algorithms may be used. c) the background, that is to say the nature or the quality of the communicated objects; these objects may be filtered, censored, adjusted according to the needs of the avionics, etc. d) the quantity (or the volume) of the exchanged data. As the avionics should not generally be overburdened (resource management and error propagation), it is advantageous to monitor the volumes and adjust them. e) privileges or priorities associated with the data and/or with the hardware systems. The allocation of the roles, privileges or priorities may be predefined or dynamic. The architectures or models may be varied: master/slave systems, dynamic or non-dynamic, peer-to-peer networks, etc.

Wireless Access

In one embodiment of the invention, the system for accessing data outside of the cockpit comprises a wireless access point 130 (Wi-Fi or Li-Fi or other; Li-Fi, for Light Fidelity, is a wireless communication technology based on the use of visible light, having a wavelength of between 480 nm and 650 nm). This access point is used by the devices from the open world to connect to one another or to connect to the gateway so as to communicate with the avionic devices. It also provides access to the Internet.

This wireless access point may be integrated directly into the gateway or be situated in the open world. In any case, the gateway is linked to the wireless access point.

As indicated above, the invention contemplates the possibility of the gateway being able to be modified so as to host all or some of the central application. The advantages and drawbacks of this possibility are explained further below.

Depending on the security level offered by the gateway, its configuration (notably the unidirectional direction 111 or bidirectional direction (111, 112) of the communications between the avionic world and the open world) and the possibility of allocating additional functions thereto (in this case to host all or some of the central application), various embodiments may be contemplated.

The methods and the systems according to the invention may notably make it possible to provide the user with a set of functions that will allow him to continuously access, from anywhere in the plane, data from the avionic world (and in combination or not in combination with data from the open world). These functions also make it possible to interact with the systems that provide the data in order to send them flight parameters. Lastly, the invention also provides a set of technical functions that will improve the ergonomics of the solution, for example depending on the type of connected apparatus or on the profile of the user.

From the list of these functions, the invention proposes various possible alternatives for projecting these functions onto various devices: (a) onto the connected lightweight apparatus situated in the open world; (b) onto a third-party machine (not necessarily mobile, situated in the open world); (c) onto the secure gateway situated in the avionic world.

According to some embodiments, the method comprises a step of determining the computational capabilities and/or the display capabilities of one or more devices or apparatuses. This analysis may be performed on a single lightweight client, but also on a plurality of accessible apparatuses situated nearby. For example, distributing the display will make it possible to use the display surface of the connected watch and of a nearby IFE screen, on request (using "drag-and-drop") from the connected watch of the pilot. Likewise, a pair of connected glasses may work together with the screens displayed in the cockpit or a pico-projector situated right at the back of the cabin. The various combinations may be graded (for example scores, grades, weightings, sorted, classified, etc.). In one embodiment, the target client or clients may be determined by abstracting the actual capabilities, and then preferred projection scenarios may be determined with respect to the role of the function, knowing that the type of the connected apparatus may still ultimately restrict the possible solutions.

The local applications may be based on a central application that runs in addition to the local applications. The central application may act as a proxy for the local functions that interact with the avionic functions through the central application. The central application is optional, but its presence in addition to the local applications has certain advantages, notably the pooling of functions accessible from any connected apparatus; mitigating the absence or lack of local resources (that is to say in the connected apparatus); making it possible to recover data from the avionic world or from the open world in masked time for the local applications (improving response times); providing a guarantee of coherence of the information between the various users (centralized data and request server); implementing centralized administrative functions on all of the users (for example profile management, authorization management by groups of users).

The central application may be hosted by the gateway or by a third-party machine (that is not necessarily mobile), situated in the open world and that connects to the gateway.

In some embodiments, one portion of the functions are allocated to the third-party machine and another portion to the gateway (central application distributed or balanced between the third-party machine and the gateway).

In one embodiment, a local application sends a consultation request to an avionic device through a central application hosted by a third-party machine (not shown). The exchanges may be or comprise the following exchanges:

1. Transmission of a request to an avionic device by the user from the local application running on the connected apparatus (for example 141, 142, 143, 144, etc.); the local application transmits this request to the central application via the wireless access point 130;

2. The wireless access point 130 relays the request to the central application running on a third-party machine;

3. The central application connects to the wireless access point 130 in order to transmit the request to the avionic devices in question via the gateway;

4. The wireless access point 130 receives the request from the central application and then transmits it to the functions of the secure gateway 120 that manages access to the avionic devices;

5. The secure gateway 120 addresses one or more avionic devices 110 in question with the received request;

6. One or more devices return the request execution feedback to the secure gateway 120;

7. The secure gateway 120 relays this feedback 110 to the wireless access point 130;

8. The wireless access point 130 in turn relays the feedback to the central application on the third-party machine;

9. The central application (possibly after post-processing) recalls the wireless access point 130, which relays the consolidated feedback from the request to the local application running on the connected apparatus (for example 141, 142, 143, 144, etc.).

Broadcasting of Data from the Avionic World

The secure gateway 120 according to the invention is an intermediary device that is inserted into the avionic world and that is connected to the avionic network. This gateway hosts the necessary routing and security functions that make it possible to broadcast the avionic data to the open world through a wireless access point while at the same time preserving the security of the avionic data. It allows the communication of data (111, 130) from the avionic functions and devices to the open world. The avionic functions and devices communicate with one another through a dedicated network (for example of AFDX type), for which the certification requirements are high. This network is generally configured statically so as to make its behaviour deterministic. The gateway provides the functionalities allowing the avionic network to preserve its characteristics before allowing avionic data to be broadcast to the open world (or vice versa).

In one embodiment, the routing function hosted by the gateway specifies the "point-to-point" connections authorized between an avionic device or function and a device from the open world. The routing rules may be dynamic (for example as soon as a new connection is required between two devices). In one embodiment, the transmission of data in broadcast mode by an avionic device allows any connected device from the open world to receive these data without it being necessary to modify the routing rules.

In one embodiment, the secure gateway 120 is connected to the Internet 121 and the open world. It then comprises mechanisms for avoiding the injection of data into the avionic systems.

In one embodiment, the wireless access point 130 is connected to the Internet 121 and performs the role of provider of the data from the open world from the Internet to the connected devices.

Routing of Non-Avionic Requests to the Devices from the Avionic World

This function is the reciprocal function of the previous function. It provides the routing of the consultation requests transmitted by the devices from the open world to the avionic functions and devices.

In one embodiment, the secure gateway hosts the routing and security functions that make it possible to route the flight parameters transmitted by the devices from the open world and received via the wireless access point to the functions and devices from the avionic world, while at the same time preserving security.

In one embodiment, the secure gateway may determine the routing functions, for example by specifying the "point-to-point" connections authorized between a device from the open world and a device or a function from the avionic world. In one embodiment, the secure gateway may also determine and initiate a broadcast or multicast mode.

Multiplexed Broadcasting of Data

In one embodiment, the data is broadcast in a multiplexed manner. Advantageously, this multiplexed broadcasting makes it possible to rectify the limitations that may exist due to the large number of possible connections between an avionic function (logical aspect) or device (physical aspect) and devices from the open world. Specifically, the avionic functions and devices do not make it possible to manage an infinite number of connections (connection requests).

In one embodiment, a single data server exists between the lightweight clients and the avionic systems. This layout makes it possible to manage the constraints, to smooth them, and/or to order them in time (for example variable priorities or criticality, access rights, etc.). This multiplexed mode may make it possible to virtually connect a large number of devices from the open world to one and the same avionic device. In other words, the "rare" resources are those from the avionic world, and they should be called upon wisely (for example cache systems, etc.). Due to its role as server, this function may advantageously be allocated to the central application and/or to a third-party machine so as not to modify the avionic perimeter.

Multiplexing of the Requests

Like the broadcasting, the method according to the invention may comprise multiplexing of the requests; so as to rectify the limitations that may exist in terms of the number of possible connections between an avionic function or device and devices from the open world. In one embodiment, a request server receives the requests from the various connected devices from the open world, this server being the only one to be connected directly to the avionic function or device that processes the request. This layout makes it possible to transfer the connection constraints to the function rather than to the service provider. In one embodiment, queues or connection queues may be managed for the purpose of distributing the requests to the avionic devices and/or functions, notably when these become available. In this way, the physical devices and functions are seen as logic devices and functions from the local applications. This embodiment may therefore make it possible to connect a large number of devices from the open world to one and the same avionic device.

Load Balancing

Besides multiplexing the data broadcasts and/or the requests, various load-balancing mechanisms may be implemented. The method according to the invention may thus comprise a step of determining the avionic function or device or devices to which a user request should be directed, notably so as to optimize the use of the resources of the overall system. This load balancing assumes that a plurality of avionic functions or devices are able to meet one and the same user request.

Optimizing load balancing may relate to the response times and/or the distribution of the computational load between the various devices.

This embodiment remains entirely optional. The advantage, where applicable, is generally that of distributing the computational loads.

In one embodiment, load balancing is performed by the central application and/or a third-party machine that "virtualizes" the physical devices and functions for the local applications.

Figure 2:
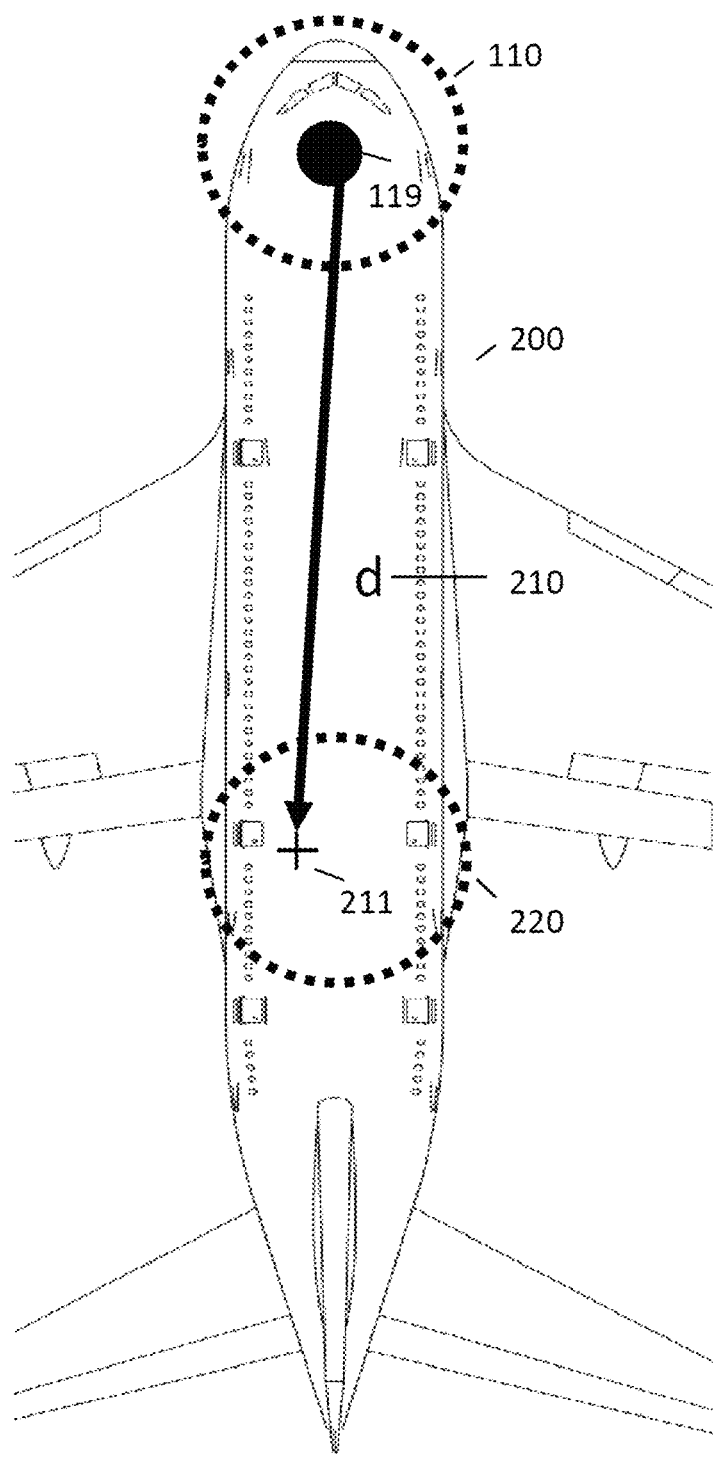
FIG. 2 illustrates one embodiment of the invention, in which the distance in space between the cockpit and a lightweight client is manipulated so as to access the avionic data.

FIG. 2 illustrates one embodiment of the invention, in which the distance in space between the cockpit and a lightweight client is manipulated so as to access the avionic data.

The avionic devices 110 of the aircraft 200 are essentially situated in the cockpit 119 (for example FMS). The flight crew (flight attendants or pilot, etc.) may move in the plane. At a given instant in time, a lightweight client is situated at a distance d 210 from the cockpit, in a spatial area 220. This physical item of data is able to be measured in various ways (described below). The "distance" is indicative of the "position" 211, modulo the topological information (seats and gangways of the plane). For a given distance, a pilot (for example) is situated in the left-hand or right-hand gangway of the plane. When the positioning technologies are more accurate, it is possible to determine the virtually exact position.

This distance value 210 may be a condition for accessing the avionic data (in order to transmit and/or to receive). Distance ranges may specifically regulate or modulate access. In one embodiment, in order to transmit and/or to receive information, it may be required to remain in certain areas of the plane ("hidden" security). In one embodiment, if a user is close enough to the cockpit, below a predefined distance threshold, the remotely modifiable flight parameters may be deactivated. In one embodiment, the quantity and/or the "quality" of the information (for example criticality, tags, content, etc.) is dependent on the distance 210. In one embodiment, the feed (in terms of quantity and/or in terms of quality) may decrease depending on the distance. In one embodiment, the feed may be inversely proportional to the distance (a pilot trapped behind the apparatus in the event of a diversion may have extended capabilities).

The step of determining the distance may be performed in various ways, possibly in combination (weighted) with one another. An "indoor positioning system" or "indoor geolocation system" makes it possible to find the position of objects or of people in a space inside a structure. Incidentally, the itineraries may be monitored and may serve as conditions for accessing the data. Topological models may show the properties of the connectivities (rooms, gangways, etc.) in an indoor space.

Various indoor position technologies may be used, possibly in combination: FM radio fingerprint positioning, networks of Bluetooth BLE beacons, networks of RFID beacons, ground coverings with networks of sensors, combination of RFID and WLAN technologies, image recognition, using ultrasound and angle of arrival techniques, using location signals from an inertial measurement unit, positioning using ambient magnetic field measurement, etc.

In detail, the approach using FM radio or location by "radio fingerprint" (or "fingerprinting signal") comprises sampling and location steps. FM waves have an energy efficiency greater than a Wi-Fi signal (between 2 and 6 times greater in terms of autonomy). One or more networks of BLE or RFID or other beacons may make it possible to position a lightweight client. The combination of RFID and WLAN technologies involves combining RFID tag identifiers with the location and with topological information in order to determine the position and predict the next subnetwork of a mobile node (utilization of the coordination capabilities provided by WLAN). Approaches based on computer vision are dynamic and inexpensive (object tracking, etc.). Positioning using ultrasound and angle of arrival techniques involves determining the propagation time of a signal in order to determine a position. An inertial measurement unit or an odometer or other types of sensor may be used in addition to the mentioned techniques (extended Kalman filter for integrating data in real time).

Figure 3:
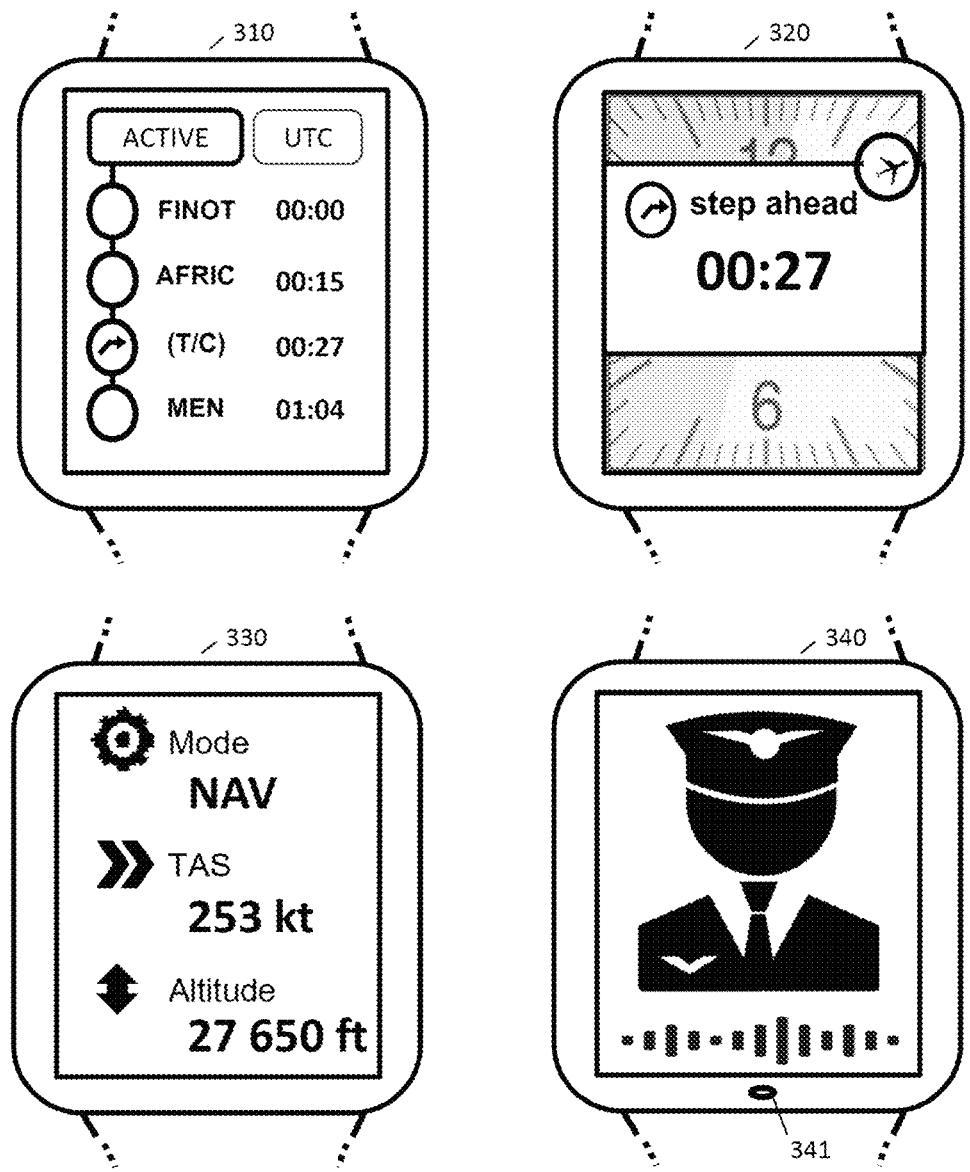
FIG. 3 illustrates examples of a user interface on a connected watch according to one embodiment of the invention.

FIG. 3 illustrates various examples of user interfaces, in the case of an embodiment of the invention implemented on a connected watch.

Notifications

Advantageously, one or more notifications may be determined and then communicated to one or more users.

A notification makes it possible to alert a user of the occurrence of a given event without said user himself having to regularly consult the data of the system to evaluate the occurrence of this event ("wake-up" or "push" function). The notifications make it possible to avoid the user having to periodically consult the basic data on which the event is based, and having to cross-correlate these basic data to evaluate the occurrence of the event. The notifications therefore make it possible for the user to save time so that he is able to concentrate on other tasks. They may make it possible to avoid human errors. They may also make it possible to reduce the stress of the user, who no longer has to worry about missing the occurrence of the event.

An event involved in a notification may relate to an item of data provided by an avionic device (for example the flight management system FMS may provide the item of information according to which the plane begins its descent into the destination airport) or correspond to an item of information resulting from the combination of data provided by a plurality of systems (for example the next crossing through an area of turbulence, this information resulting from the cross-correlation of the trajectory of the plane provided by the FMS and weather data provided by a server accessible from the open world).

The interface 310 illustrates an example of an interface or screen that provides the waypoints or flight plan point. The example 320 illustrates a notification by way of which the pilot is reminded that a change in flight plan level is forecast in the future (in 27 minutes). The example 330 illustrates a synthetic view of the situation of the aircraft (for example comprising the current altitude or flight level). In some embodiments of the invention, for example 340, the connected watch comprises a camera 341 notably allowing videos to be exchanged between the pilot and the copilot.

In one embodiment, the notifications are configurable. A user may specifically wish to subscribe to notifications provided by default and/or program his own notifications (for example by selecting the necessary data fields and by specifying the rules for combining these data in order to evaluate the occurrences of an event of interest).

In one embodiment, the pilot may also activate or deactivate notifications, for example depending on the times of his operational mission.

In one embodiment, the pilot may determine or configure the criticality level associated with the various notifications (for example between general information, alerts, emergency messages, etc.).

The notifications may be transmitted in various forms or using various techniques.

In one embodiment, a notification is transmitted in visual form. For example, the display may be displayed virtually in the connected glasses or via a video headset worn by the pilot.

In one embodiment, a notification is transmitted in audio form. For example, the pilot may wear an earpiece or an audio headset or a headset microphone combination.

In one embodiment, a notification may be transmitted in vibration-based form. For example, the pilot may wear a connected watch comprising a vibrator.

In one embodiment, a notification is transmitted in multimode form, that is to say by combining one or more techniques comprising a display, an audio transmission, a vibration or any haptic feedback.

Advantageously, according to the embodiments of the invention, a notification may be strictly personal (for example coding of the number of vibrations, virtual and personal displays, transmission of a sound in the headset, etc.). In some embodiments of the invention, a notification may be public (for example simultaneous display on the IFE screens).

To be strictly personal, some notifications may for example be coded in terms of the number of vibrations, via internal and subjective displays in a video headset, etc.

Moreover, beyond the public or private aspect of a notification, the attention of the user may be attracted or captured in a certain manner (the probability of the message correctly reaching its destination is high). In one embodiment of the invention, a notification acknowledgement system makes it possible to obtain the assurance that the message has been correctly delivered (for example tapping on the watch, acknowledgement by sliding an icon, inputting a PIN code, blinking, etc.).

The notification management may be implemented on the central application and on a third-party machine (pooling of the management of events of interest to a plurality of users). This embodiment may furthermore lighten the network load, by avoiding each user independently accessing the avionic devices.

In one embodiment, the notification management is implemented locally (local application), for example if the condition or the event to be monitored is specific to a precise user.

Moreover, the notifications may be regulated in various ways. A notification may be communicated generally to all of the lightweight clients, or specifically (that is to say to a selection of lightweight clients). The application of local rules may also modulate the occurrence of the local notifications. These local rules may prohibit or add or delete or substitute a notification with one or more other notifications.

Data Fusion and Display Management

The avionic data may be dispersed. It may be advantageous to modify them (addition, deletion, substitution, cross-correlation with data from the open world, etc.) before redistributing them using various techniques.

Dispersed Avionic Data

The data of a function (or of an avionic subsystem) are generally accessible by way of a single interface: that of the avionic function or subsystem in question. By contrast, a user may need to consult a plurality of avionic functions or subsystems (and therefore as many interfaces) for an overall appreciation of an operational situation. The embodiments of the invention make it possible to manage these sparse data.

Physically, the interfaces may be located at various locations (dispersed) in the cockpit and/or the cabin (the rest of the plane outside of the cockpit). For the pilot, the requirement to consult all of the interfaces separately may impair his reactivity, which is sometimes necessary to make an operational decision and requires high concentration from the pilot. Furthermore, assuming that the pilot has all of the necessary data, he still needs to cross-correlate these data, to filter them, to consolidate them, to synthesize them, before having operational data for making a decision. This data-processing activity in this case too slows down his reactivity to making a decision. It is also a source of human error.

Display Distribution

In one embodiment, the display according to the invention may be "distributed" (in the form) on one or more lightweight clients and (background) information fusion and/or reduction steps may be implemented for the purpose of assisting the pilot in making a decision.

The embodiments of the invention do not limit a priori the type of connected apparatuses to be used. By contrast, the capabilities of these apparatuses, notably in terms of their own display and computational power possibilities, make it possible to adjust the displays and to optimize the use of the available resources. The local application may have the capability of detecting the type of apparatus on which it is running in order to determine the available resources, and then self-adapt by automatically activating the configuration offering the greatest number of possible functions and allowing the richest display that there is. For example, on start-up, the local application may determine the type of connected apparatus and then the features specific to this apparatus (for example the display capabilities and the CPU power). The local application may then automatically select the optimum configuration able to be executed on this apparatus (or a set of apparatuses).

Data Reduction, Increase and Fusion

The data fusion may be combined with the multiplexed data broadcasting.

This embodiment is aimed at assisting users in making operational decisions. Specifically, the raw data provided by the various avionic devices or from the open world are not necessarily able to be utilized directly in their raw state to provide the information necessary for the user for making a decision. An item of information useful for the operator is often the result of the cross-correlation of a plurality of elementary data provided by a smaller or larger number of devices.

The data fusion involves notably taking over these selection, cross-correlation, combination, consolidation, filtering etc. operations, which are currently performed by the users themselves (with a non-negligible risk of error). The information fusion goes beyond the automation of the mental act, since machine capabilities nowadays allow the human-machine interaction to be redefined in terms of quantity, speed and analysis speed.

In the embodiments in which this information fusion is implemented on the central application, it avoids the local applications accessing the various contributing systems multiple times, each from their side, thereby making a contribution to lightening the network load by pooling access. Lastly, this fusion bears the responsibility for guaranteeing the coherence of the fused data with regard to the local applications.

In one embodiment, the information fusion may be performed on the central application and on a third-party machine, thereby giving it the advantage of pooling the requirement for a plurality of connected apparatuses. In one embodiment, the information fusion may be implemented on a local application if the central application does not exist.

Optionally, the display on one or more worn lightweight clients or ones that are nearby (in relation to the user) may comprise one or more image acquisition cameras. A camera may be fisheye, stereoscopic or another type of camera. This feedback of images allows numerous advantageous developments of the invention. A worn camera or video camera may make it possible to capture at least some of all of the visual information displayed for the pilot (advantageously, this video feedback may be situated on a head-up visor, smart glasses or any other device worn by the pilot, so as to capture the subjective view of the pilot). Using image analysis (performed regularly at fixed intervals or continuously in the case of video capturing), the subjective view of the pilot may be analysed and modified or corrected, depending on predefined criteria and/or according to predefined objectives.

For example, in one embodiment, the visual density of the information that is displayed may be determined or estimated. For example, this density may be estimated using various sub-portions of images, and display adjustments may be determined dynamically. For example, if a display screen becomes overly "burdened" (amount of text or graphical symbols exceeding one or more predefined thresholds), the lowest-priority information may be "reduced" or "condensed" or "summarized" in the form of markers or symbols. Conversely, if the density of information displayed allows, reduced or condensed or summarized information may be expanded or detailed or extended or enlarged (or moved towards nearby display apparatuses).

Figure 4:
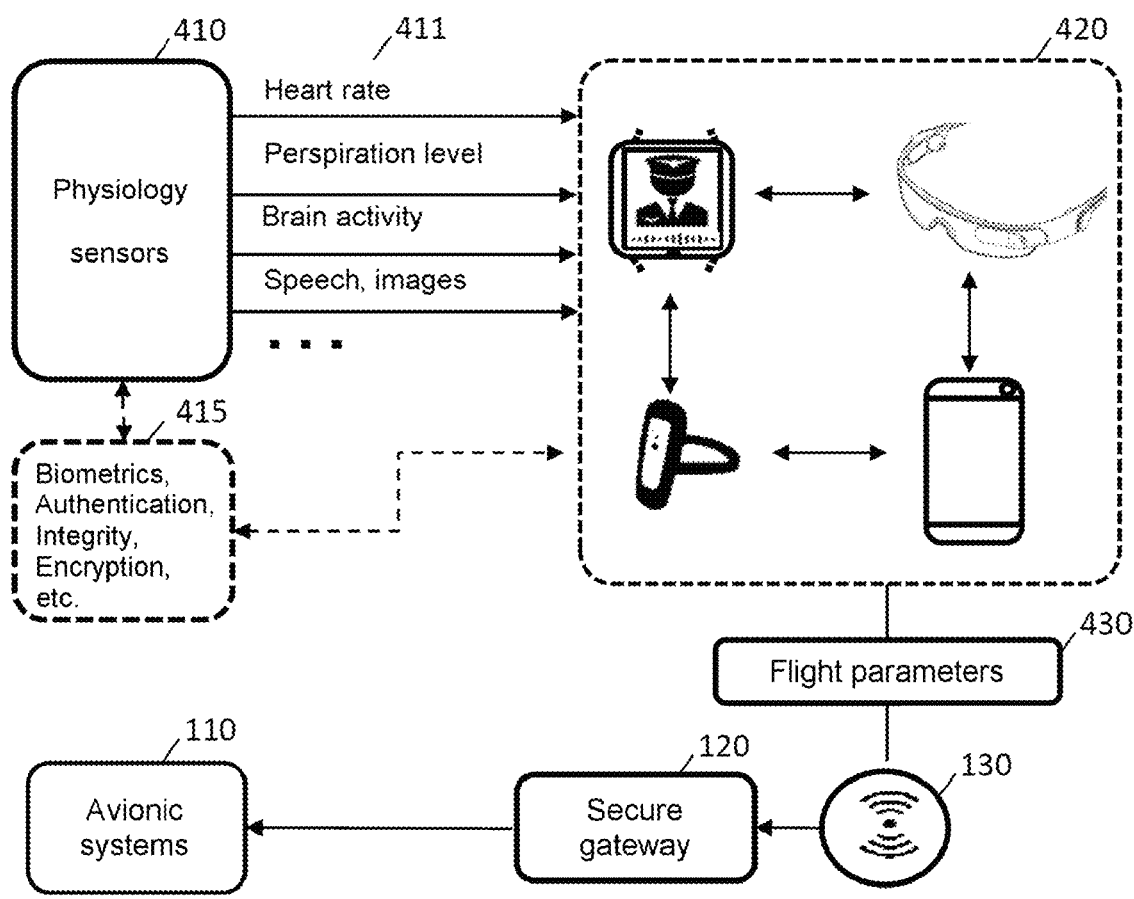
FIG. 4 illustrates the sending of a flight command or of a flight parameter from one or more lightweight clients to the avionics via the secure gateway and the access point.

FIG. 4 illustrates the sending of a flight parameter from one or more lightweight clients to the avionics via the secure gateway and the access point.

In one specific embodiment, the method comprises a step of communicating flight parameters 430 from one or more lightweight clients (for example a connected watch, connected glasses, etc.) 420 and then injecting these flight parameters via the secure gateway 120 and the access point 130 into the avionic systems 110.

The flight parameters (or flight data) may take different forms (for example flight plan, instruction, constraint, performance data, etc.). These flight parameters are supplied to the avionics, which will in turn generate specific flight commands (for example actions on or towards the fins, etc.).

This possibility of making decisions via a lightweight client worn by the pilot or the copilot is revolutionary and goes against numerous common prejudices or habits in avionics.

Optional steps 415 comprise one or more steps from among the steps comprising a biometric verification step, an authentication step, a step of checking the integrity of the transmitted command message or flight parameter, an encryption step, etc.

In one embodiment, one or more physiological sensors 410 and/or biometric sensors 415 form a condition for the possibility of transmitting flight parameters 430 or even the ability to receive a flight parameter.

Specifically, to be taken into account, a flight parameter has to emanate from a known or identified person operating in normal conditions. Wearing the lightweight client on oneself constitutes per se a first identification guarantee, but biometric tests may confirm (or overrule) this assumption. Next, tests on the physiological conditions (for example extreme stress, uncertainties or anomalies with regard to physical and/or cognitive being) may modulate the sending of parameters (from the prohibition, prevention to the ability to receive under conditions, etc.). Moreover, distance conditions and/or position conditions may also be taken into account.

In one embodiment of the invention, a lightweight client comprises or accesses one or more physiological sensors, configured so as to measure various physiological parameters of the pilot. For example, the heart rate of the pilot may be measured by a connected watch (or by earpieces or earbuds) and optionally form a condition for the entry of a flight parameter. For example, above or below predefined thresholds or threshold ranges, flight parameters may be rejected. Many other physiological parameters may be determined or measured and taken into account in the flight parameter accessibility and/or display management.

In one embodiment, the physiological information comprises one or more of the parameters comprising (order unimportant): gaze tracking, comprising tracking the movements of the eyes and/or the gaze fixations ("nearest neighbour index" or NRI), the cortisol level recovered in the saliva, for example ("hypothalamic pituitary adrenal" or HPA), heart rate, variability of this heart rate ("heart rate variability" or HRV), one or more markers of the activity of the parasympathetic nervous system, breathing rate, skin temperature, perspiration level, skin conductivity ("galvanic skin response" or GSR), pupil dilation ("pupilometry" or "index of cognitive activity (ICA)"), an ECG (electrocardiography) signal, an EEG (electroencephalography) signal, an MEG (magnetoencephalography) signal, an fNIR ("functional near-infrared imaging") signal or an fMRI ("functional magnetic resonance imaging") signal.

The determination of the physiological state of the pilot may comprise direct and/or indirect measurements. The direct measurements may notably comprise one or more direct measurements of the heart rate and/or ECG (electrocardiogram) and/or EEG (electroencephalogram) and/or of the perspiration and/or the breathing rate of the pilot. The indirect measurements may notably comprise estimations of the excitation or of the fatigue or of the stress of the pilot, which states may in particular be correlated with the flight phases or with other parameters.

In one embodiment of the invention, the connected watch comprises one or more biometric sensors, configured so as to authenticate the pilot with the systems according to the invention (for example fingerprint, iris scan, speech identification, handprint, facial recognition, etc.).

In one embodiment, biometric sensors and physiological sensors may be used in combination.

Command with High Abstraction Level

In one embodiment of the invention, the invention makes it possible to make requests to the various subsystems using parameters or flight commands with a high abstraction level. For example, one action according to the prior art may involve providing one and the same item of operational data in two separate subsystems. According to one embodiment of the invention, a flight parameter (for example velocity value) or a single integrated flight command (for example diversion) may be used. Specifically, according to one embodiment of the invention, the required item of data may be duplicated to the two subsystems, reducing the risk of the user making an error when providing information to the two subsystems under consideration himself.

In contrast to the information fusion (which is aimed notably at deleting relatively unhelpful information), an integrated flight command from a lightweight client targets a high-level abstraction, that is to say a plurality of flight parameters to which a plurality of elementary requests to a plurality of avionic devices will correspond.

In one embodiment, a flight command or a flight parameter may comprise or correspond to one or more calls to APIs (application programming interfaces). The granularity of the services of this API may in particular be coherent with the parameters that the user may need to transmit in order to perform an operational mission. More precisely, for a given operational requirement, there may be a need to act with a plurality of functions or subsystems, sometimes to perform one and the same action on a plurality of functions or subsystems, with the risk of human errors that this entails.

In one embodiment, the method comprises a step of determining the elementary requests associated with a received flight parameter. Thereafter, the various elementary requests are communicated to the various avionic devices in question (possibly by duplicating them). In one embodiment, a single item of functional feedback is provided, itself also resulting from the combination of individual feedback or responses to the elementary requests. The single item of functional feedback may be operationally significant for the user. This embodiment makes it possible to reduce human errors.

In the embodiments in which these flight parameters are implemented via the central application, the latter is able to avoid the local applications taking over the elementary requests, thereby possibly contributing to simplifying the local applications (pooling of requirements).

Example of Sending a Flight Parameter by Earpiece

An embodiment in which one or more flight parameters are communicated by a connected earpiece is described below. A connected earpiece (for example Bluetooth BLE, or Bluetooth version 5, with a range 4 times greater than Bluetooth V4.2, Wi-Fi earpiece or another earpiece, etc.) or an earpiece connected at short range via a telephone using Wi-Fi that connects to the central application using Wi-Fi. In this embodiment, audio messages may be broadcast from the central application to the connected earpieces. In one embodiment, an earpiece is equipped with a microphone, and the method may comprise a step of processing the voice commands (for example voice identification, voice recognition, etc.) by way of the central application. The audio messages may serve as a support for the communication of general information (for example the change to cruising phase), for notifications involving a feedback action from the member of the flight crew receiving the message (for example an imminent planned change of flight level), or for alert messages (for example the next passage through an area of turbulence). These messages may take the form of standardized sounds or spoken messages (human voice). The spoken messages may either come from connected users who communicate with one another through their microphones and via the central application, or result from a voice synthesis managed by the central application, so as to express, in human form and orally, an item of information from the avionics (for example the update to the predicted landing time).

In one embodiment, voice commands may be manipulated. These commands may relate to commands for administering interactions between the central application and the earpiece, for example the activation or deactivation of the notifications. In some embodiments, voice commands may be used (for example voice recognition) to transform the spoken orders from the users into flight commands or flight parameters provided in the APIs of the central application, which then transfers them to the avionic systems in question.

As it is lightweight, the implementation as earpieces is advantageous as it is very unobtrusive for the movements of the user, making it possible to remain connected to the avionics and to the rest of the flight crew all the time and from anywhere in the plane. All of the crew (from the pilots to the flight attendants) are possible users of the earpieces at one moment or another of their mission.

Other Systems for Sending a Flight Parameter

In one embodiment, the flight parameters are communicated using a pair of connected glasses. Wearing connected glasses (or lenses, even having a low resolution) has several advantages: a personal display (not necessarily limited or required, since large virtual screens may be displayed), guarantee of authentication since the irises of the wearer are able to be tested, audio channels (input/output), limited obtrusiveness, etc. A worn camera furthermore allows capturing of the subjective view of its wearer, visual density measurements, facial recognition of passengers, augmented reality options, etc.

In one embodiment, the flight parameters are communicated using a connected watch. Wearing a connected watch provides certain advantages: a certain guarantee of authentication (physically worn by the user, locking code, biometric signature measurements, etc.), a personal display, audio and/or video channels (input/output), limited obtrusiveness, etc. An embedded camera or projector furthermore allows certain capturing of the subjective view of its wearer, facial recognition of passengers, augmented reality options, etc.

In some embodiments, several types of lightweight client are deployed, that is to say a combination of earpieces, mobile telephones, connected glasses, connected watches, etc. Advantageously, the interactions are multi-mode.

Human-Machine Interfaces

The human-machine interface according to the invention may also comprise input interfaces or peripherals. In one development, the device comprises means for selecting one or more portions of the virtual display. Pointing at the human-machine interfaces (HMIs) or portions of these interfaces or information may be able to be performed using various devices, for example a mouse-type pointing device or identification based on manual pointing; via acquisition interfaces (button, roller, joystick, keyboard, remote control, motion sensors, microphone, etc.), or via combined interfaces (touchscreen, force-feedback controller, gloves, etc.). The input or selection human-machine interfaces may specifically comprise one or more selection interfaces (menus, pointers, etc.), graphical interfaces, voice interfaces, gesture and position interfaces. In one advantageous embodiment, a selection may be made using gaze (for example fixation duration exceeding a threshold of predefined duration, blinking, concomitant voice command, muscle contraction, foot control, etc.). In one embodiment, a selection may be made by one or more head movements.

The selected display may be varied (type) and a plurality of spaces or surfaces (for example planes, curves, etc.) may be mobilized. A display may be a head-down screen, an HUD, a headset visor or a windscreen. A display may also result from a projection. In some embodiments, the projection spaces are selected "opportunistically" (for example, the unused spaces of the instrument panel are used, for example the jambs or the interstitial spaces between the screens). In one embodiment, one or more spaces may be predefined for projections (they may be intentionally dedicated to this task). For example, a free area of the cockpit may allow a projector to display information. In general, there is nothing to restrict this projection freedom, which projection may be performed onto any type of support (for example plastic, fabric, glass, etc., including a human body), given that the projection systems are able to adjust their display so as to comply with the environment and produce stable and formed images, with knowledge of the target subjective viewpoint.

A description is given of a computer program product, said computer program comprising code instructions for performing one or more of the steps of the method when said program is executed on a computer.

By way of example of hardware architecture appropriate for implementing the invention, a device may include a communication bus to which a central processing unit (CPU) or microprocessor are connected, which processor may be "multicore" or "manycore"; a read-only memory (ROM) able to contain the programs necessary for implementing the invention; a random access memory (RAM) or cache memory containing registers suitable for recording variables and parameters that are created and modified during the execution of the abovementioned programs; and an I/O ("input/output") or communication interface suitable for transmitting and for receiving data. If the invention is implanted in a reprogrammable computing machine (for example an FPGA circuit), the corresponding program (that is to say the sequence of instructions) may be stored in or on a storage medium that is removable (for example an SD card or a mass storage means, such as a hard disk, for example an SSD) or that is non-removable, that is volatile or non-volatile, this storage medium being readable in part or in full by a computer or a processor. The reference to a computer program that, when it is executed, performs any one of the previously described functions is not limited to an application program running on a single host computer. On the contrary, the terms computer program and software are used here in a general sense to refer to any type of computer code (for example, application software, firmware, microcode, or any other form of computer instruction, such as web services or SOA or via programming interfaces API) that may be used to program one or more processors so as to implement aspects of the techniques described here. The computing means or resources may notably be distributed ("cloud computing"), possibly with or using peer-to-peer and/or virtualization technologies. The software code may be executed on any suitable processor (for example a microprocessor) or processor core or a set of processors, whether they are provided in a single computing device or distributed between several computing devices (for example such as possibly accessible in the environment of the device). Security technologies (cryptoprocessors, possibly biometric authentication, encryption, chip card, etc.) may be used.

The invention claimed is:

1. A method for communicating avionic data to a non-avionic device situated outside of the cockpit of an aircraft, the method comprising the steps of:
    receiving a request, aimed at receiving avionic data from one or more avionic systems situated at a reference point in the aircraft, from a non-avionic client device;
    determining a connection parameter between the non-avionic client device and the reference point;
    adjusting the sending of data in response to said request depending on the determined connection parameter.

2. The method according to claim 1, the connection parameter comprising one or more space and/or time parameters characterizing the relationship between the non-avionic client device and one or more avionic systems, the connection parameter notably comprising the physical distance between the non-avionic client device and the reference point in the aircraft, and/or the quality of service associated with the wireless communications between the non-avionic client device and the reference point in the aircraft, and/or a predefined access right associated with an avionic device and/or with the non-avionic client device.

3. The method according to claim 1, the reference point being the cockpit of the aircraft or of another aircraft, or an emergency door, or a rest point, or a passenger seat.

4. The method according to claim 1, the request being received by a wireless access point associated with a secure gateway, said secure gateway determining the access rights to the avionic data for the non-avionic client device.

5. The method according to claim 4, the secure gateway for exchanging data between the avionic system and the non-avionic system implementing functionalities comprising routing rules, communication port management for authorizing or prohibiting communications, and protocol layer management.

6. The method according to claim 1, the step of adjusting the sending of data furthermore being dependent on the display and/or computational capabilities of the non-avionic client device.

7. The method according to claim 1, the sending of data being reduced or stopped or increased or modified if the determined distance is above or below predefined thresholds or threshold ranges.

8. The method according to claim 2, the step of determining the distance or the position between the non-avionic device and the cockpit of the aircraft being performed by applying one or more technologies comprising FM radio fingerprint positioning, by using a network of Bluetooth BLE beacons, by using a network of RFID beacons, by using a ground covering with networks of on-board sensors, by combining RFID and WLAN technologies, through image recognition, by ultrasound and angle of arrival techniques, by using an inertial measurement unit and/or positioning using ambient magnetic field measurement.

9. The method according to claim 1, the communications being unidirectional from avionic systems to the non-avionic device, said communications comprising one or more notifications using one or more techniques, comprising a visual, audio and/or vibration-based technique.

10. The method according to claim 1, the communications being bidirectional between the avionic systems and the non-avionic device.

11. The method according to claim 1, wherein the non-avionic device comprises an earpiece and/or a connected watch and/or a pair of connected glasses.

12. The method according to claim 1, furthermore comprising a step of sending data from the non-avionic client device to the avionic systems of the cockpit, the sending being wireless from predefined non-public spatial areas in the aircraft, and/or by way of wired connections not accessible to the passengers.

13. The method according to claim 1, furthermore comprising one or more of the steps of making the sending of data conditional on the previous registration of the non-avionic device with the cockpit, carrying out a biometric authentication step, checking the physiological conditions of the wearer of the non-avionic device, and/or encrypting the communications.

14. The method according to claim 1, wherein an avionic system is associated with a physical fault rate that is lower and a logic verification that is higher than that of a non-avionic system.

15. The method according to claim 1, wherein an avionic system is associated with a test and/or verification exhaustiveness that is higher than that of a non-avionic system.

16. A non-transitory computer readable medium comprising a computer program product, said computer program product comprising code instructions that when executed on a computer cause the computer to perform the steps of the method according to claim 1.

17. A system for implementing the method according to claim 1 for communicating avionic data to a non-avionic device situated outside of the cockpit of an aircraft.

* * * * *